Driven By Driven Shaft Current
Function Of Car Speed

Manual And/Or
Automatic Centering
Device

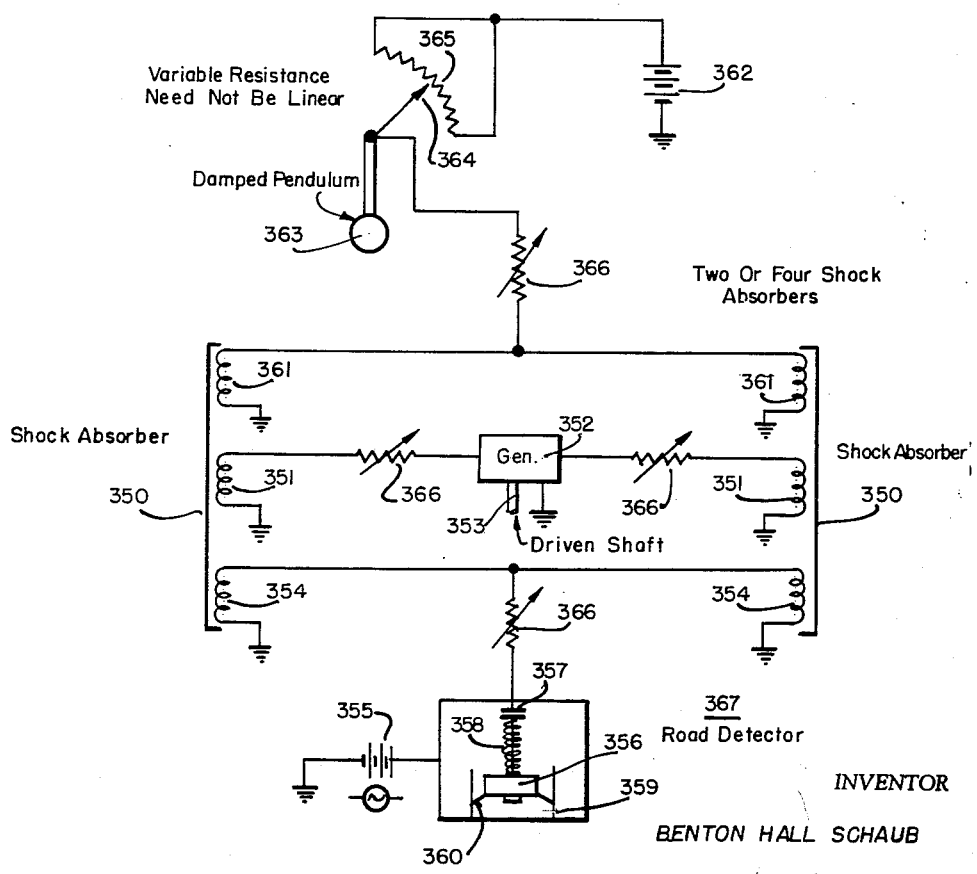

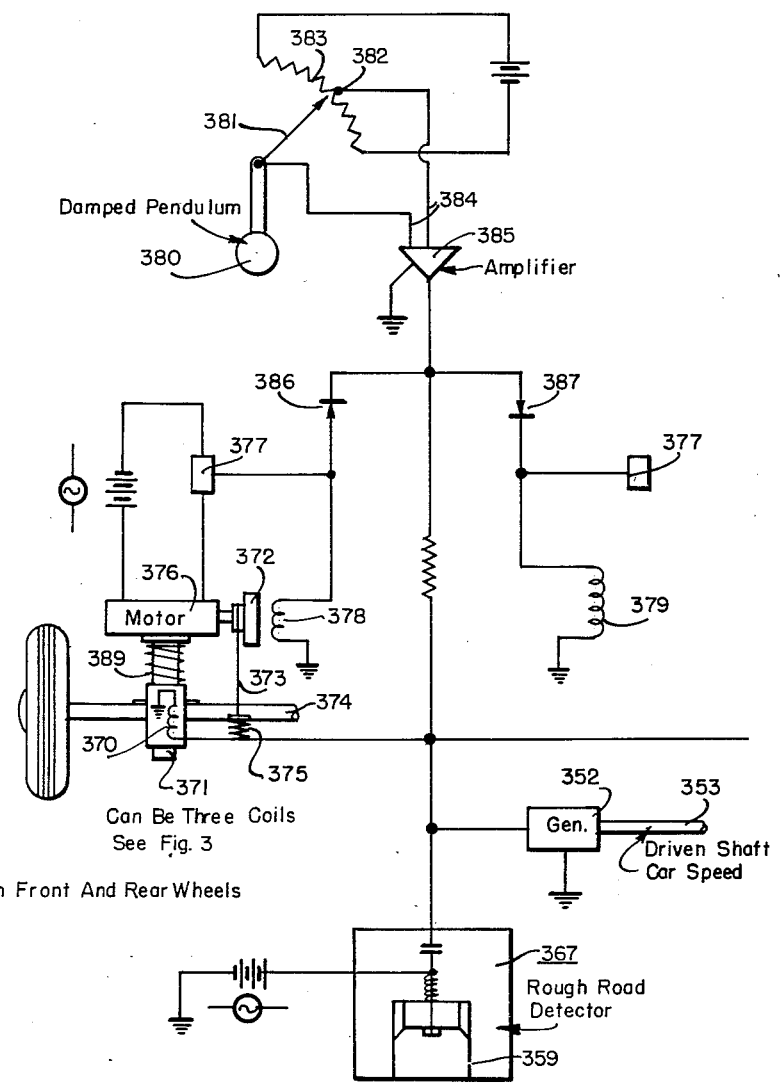

United States Patent Office 3,006,656
Patented Oct. 31, 1961

3,006,656
AUTOMATIC ACCESSORY CONTROL FOR MAGNETIC PARTICLE SHOCK ABSORBERS
Benton Hall Schaub, P.O. Box 34, Gambrills, Md.
Filed Sept. 19, 1955, Ser. No. 535,013
12 Claims. (Cl. 280—112)

The invention concerns improvements in adjustable vehicular shock absorbers, tensioning and stabilizing constructions for automotive vehicles.

It is an object of the invention to provide automatic controls for accessories such as superchargers, air conditioners, fans, generators, shock absorbers, stabilizers, top actuators, positive cornering devices, power steering mechanisms and the like.

It is an object of the invention to provide a magnetic particle clutch and an automatic transmission comprising one or more magnetic particle clutches in which the magnetic particles comprise an alloy resistant to oxidation and corrosion such as iron-nickel, iron-cobalt, iron-titanium, iron-chromium, iron-manganese, Al-ni-col and combinations of the above. While iron-ferrous combinations may be used, in general alloys with iron are presently preferred with enough carbon included to make steel of the iron.

It is an object of the invention to provide a magnetic particle clutch having magnetic journal seals to prevent contamination of bearings by fine or powdered material.

It is an object of the invention to prevent contamination of journal and bearing in a magnetic particle clutch by using magnetic fillings of large enough size that they are excuded by the ordinary bearing with or without a packing gland.

The magnetic material employed herein may comprise one or more of the following materials alone or as alloys: iron, carbonyl iron, magnetite, steels of various kinds, nickel, cobalt, manganese, titanium, aluminum, chromium and the like. Various alloys may be employed such as Al-ni-col, Permalloy, Alfenal and aluminum-iron combination. Bismuth may be used because of its dimagnetic properties. Magnetic alloys containing chromium, nickel, tungsten for example resist oxidation and corrosion. Carbon in the steels for example hardens the particles to resist erosion and crumbling. Tungsten and nickel increase the hot strength of the particles. Copper or silver may be added to increase the heat conductivity of the mass. Beryllium may be added to harden the copper.

The various materials listed having the necessary magnetic properties may be used alone as a powder, colloidal particles, filings, finely divided material or particles of various sizes and shapes. The materials may be separately powdered and used in combination as a dry mixture or alloyed to achieve the desired characteristics. Mixtures in some cases yield improved magnetic properties, increased Curie point, better release on removal of the magnetic field, longer active life under load, better heat dissipation, resistance to corrosion and erosion. The heavier automotive, ship and railway applications require far more care in selection while the light control applications operate well with almost any reasonably magnetic material.

In general carbonyl iron alone or alloyed with nickel, cobalt, tungsten, and/or aluminum for heat resistance have been found successful. The so-called "stainless" steels, with or without chromium content, are really stain or rust resistant and are useful in many applications.

Various additives or vehicles may be employed for lubricant purposes such as oil, kerosene, benzene, graphite, chalk, mica, soapstone, the silicones or glycerine. In addition to lubrication these materials have a "chain-breaking" function on removal of the magnetic field in that they facilitate particle release. Silicones and glycerine have temperature advantages.

Journal sealing bearings as employed herein may be special constructions known to the art employing scrapers, magnetic traps, sealing rings and the like to prevent powder from penetrating the bearings or the term may be applied to bearings having a smaller clearance than will permit magnetic filings to enter the bearing proper. For this purpose filings are preferable and the fines are screened out. The magnetic material selected for such application should be tough enough to resist fracture into pieces small enough to enter the bearings themselves. When magnetic traps or special rings are not used the particles should all be of a size large enough not to enter the bearings. The term journal sealing bearings as used herein is intended to cover and include this correlation of particle size and bearing clearance as well as the special constructions mentioned above.

Particle shape and relative size are factors which should be taken into account for various clutch applications. A mass of particles of different sizes and angular shape provides a close packed highly permeable mass. Regular size and rounded shape like a bunch of marbles tends to prevent packing and joining. Spheres may be preferred for applications requiring quick release if the material selected provides a sufficiently permeable mass. Hemispheres, trihedrons, quadrahedrons, cubes and the like can be used. Again rough filings and fractured irregular particles have been successful though screening of fines usually improves the resultant mass.

Where vehicle is used whether it is oil or graphite the heavier applications such as automotive, ship or railway give better results where the amounts are small. This is particularly true of oil with volatile constituents or tarry residues. Larger amounts of graphite may normally be used where heavy loads are involved than oil because of its greater stability. Usually with oil a film is sufficient though more may be used if desired where the character of load permits. The film formed around the particles may be dry as in the case where the volatile part of the vehicle has been evaporated, leaving a thin film or coating around the individual particle.

The mix preferred for general use is the dry mix which may comprise carbonyl iron powder or an iron alloy alone, a mixture of several different magnetic material particles, with or without graphite or small amounts of oil, kerosene or benzene with the more volatile constituents evaporated. Where bearing contamination or oil carbonization due to excessive particle heating under highly localized loads is not a factor oil may be used much more liberally. In such cases elimination of the flux gaps may become a factor of importance. A lightly sintered or spongy mass of iron particles could provide the flux gap bridge in such cases, but might possibly fail to give sufficient depth of slip in some cases.

A factor of some importance in heavy load applications lies in the "give" in the mating clutch surfaces or the depth of mass in relation to surface contact area. Sufficient depth or thickness of the particle mass is necessary to prevent grabbing on load application and to provide positive smooth application of torque. In planetaries the material comprising the particle mass may be an annular band of an eighth of an inch or less in thickness.

In the drawings like numerals refer to like parts throughout.

FIGURE 3 is a schematic arrangement of one form of vehicle stabilizing arrangement according to the invention.

FIGURE 4 is a schematic diagram of another form of vehicle stabilizing arrangement according to the invention.

It will be appreciated that upon removal of the magnetic field or a decrease in its intensity, a corresponding decrease in the gripping action of the magnetic particles will occur. Where there is substantial residual magnetism in the particles or filings, the chains of magnetic particles can produce a drag which is highly undesirable. One function of the material added to the particle mix which is quite aside from lubrication, is to cause the prompt breakdown of the magnetic particle chains on removal of the energizing field. This is accomplished by the actual physical separation of particles by a thin coating such as an oil film, or the non-magnetic material added to the mix when in powder form. Elsewhere, mention is made of prevention of corrosion of the magnetic particles to maintain their characteristics. This is quite a different matter and does not include thin coatings which may result from mere surface oxidation or the like. Such thin coatings whether a film of oil, glycerine, or the like, can in some applications be beneficial in eliminating drag. The above effect may be quite independent of any lubrication property as such which may or may not be present depending upon the material used or the character of the coating. A powder mix with magnetic filings may have particles so different in size that the filings are separated by powder which may roll ball-like between adjacent filings to decrease friction and at the same time eliminate drag by breaking the chains of magnetic particles on the removal of the field. Again, when steel filings are combined with powdered magnetite the chain breaking function can be obtained even though both materials are magnetic, because of the spacing of the filings by the magnetite granules and the difference in magnetic characteristics.

The present invention lends itself to stabilization and ride qualities of an automotive vehicle both on straight roads and while cornering or on turns. The relative softness and hardness of shock absorber action can be made a function of speed, road roughness, path curvature or any combination of these three factors. Again, by means of a damped pendulum and associated circuitry the center of gravity of the vehicle may be shifted toward the center of curvature so that the load on the wheels is equalized much as is done in railroad systems by elevating the outer rail on a curve. Here however the shift of the center of gravity is not fixed but is a function of the radius of path curvature and of speed.

Figure 1:
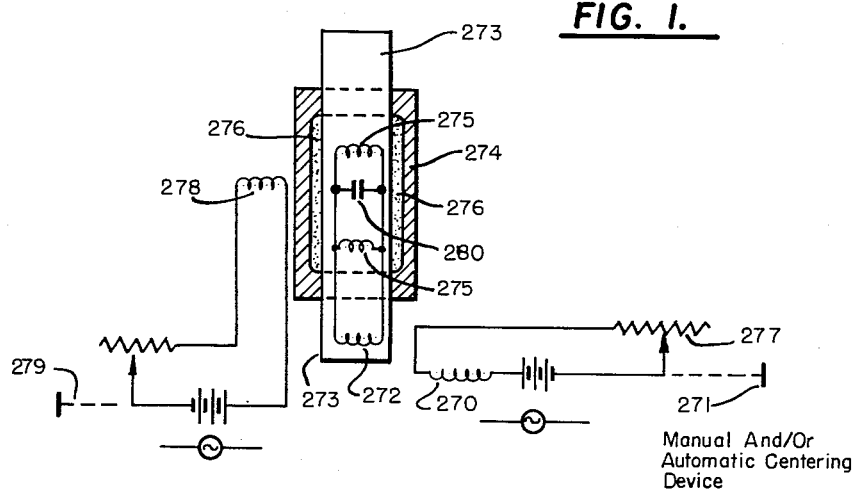
FIGURE 1 is a front elevation partly in section of one form of magnetic particle shock absorber and a control circuit therefor.

In FIGURE 1 is shown a form of shock-absorber and control which may be used alone or in combination with other controls discussed herein. Hydraulic shock absorbers have drag as a function of velocity. At rest they have zero resistance to motion. The type of shock absorber shown in FIGURE 1, utilizing magnetic particles between relatively moving poles also has such a function where the motion generates the current supply for the actuating coils. Winding 270 excited from a manual or automatic control 271 would establish an A.C. or D.C. field in which winding 272 would move with rod 273 relative to cylindrical housing 274. The relative movement would generate a current which would flow through windings 275, actuating or producing the braking force between rod 273 and housing 274 by creating a magnetic field in the highly permeable magnetic particles 276.

Rod 273 and housing 274 would be attached one to each of two parts moving relative to one another the motion of which is to be damped. For example the two parts may comprise the running gear and the frame of an automobile. The higher the current in winding 270 the stronger the magnetic field acting on the magnetic particles 276 and the greater the braking action. Stiffer shock absorbers are obtained by increasing the current in winding 270. The current in winding 270 is preferably A.C. and can be manually adjustable or controlled automatically by movement of lever 271 and rheostat 277. Under many circumstances it would also be desirable to have a constant drag which could be supplied by a separate winding 278 continuously excited. The current flow in winding 278 can also be manually adjustable as at 279. Windings 270 and 272 constitute a generator and could be equivalently shown by a rack driving a pinion on a conventional generator. A condenser 280 across coils 275 would serve to displace drag in time from velocity. The current flow in coils 275 without condenser 280 would be in phase with maximum velocity, maximum drag occurring simultaneously. A lag, if not already present could be obtained by loading coils 275.

Figures 2, 2A:
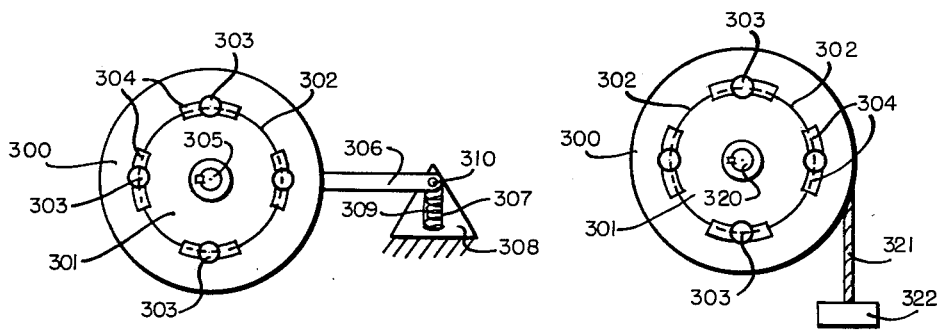
FIGURE 2 is a front elevation of another form of shock absorber using magnetic particles.
FIGURE 2A is a modification of FIGURE 2 to provide a tensioning or movement producing device of general application.

FIGURE 2 discloses another form of shock absorber in which an outer wheel 300 encloses an inner wheel 301 with sufficient clearance between them to house magnetic particles 302 in annular form between the two cylindrical members. Energizing coils 303 may be provided with flux distributing shoes 304. Inner wheel 301 is keyed to a shaft stub 305 fixed to one member of a vehicle such as the chassis. Outer wheel 300 is connected by arm 306, slot 307 and mounting 308 mounted on another member of a vehicle such as the running gear. A spring 309 permits restrained movement of connecting pin 310. Shaft stub 305 and mounting 308 may be mounted one on each of any two relatively movable members between which cushioning is desired. The amount of cushioning can be controlled between zero resistance to movement to actual locking of the two members by control of the current in coils 303.

FIGURE 2A shows a modification of the structure of FIGURE 2 in which a shaft 320 is rotating and the force exerted by cable 321 on member 322 is a function of the action of the field produced by coils 303 on particles 302 between inner wheel 301 and outer wheel 300. The force exerted by cable 321 can be sufficient to produce relative movement between shaft 320 and member 322. Shaft 320 may be pulled downwardly, member 322 may be pulled upward or both movements may occur simultaneously or sequentially depending upon the application. One application of the structure of FIGURE 2A will be discussed in connection with FIGURE 4, but will be understood that this is illustrative and is not to be taken as limiting. The same is true of the other figures of the drawing.

FIGURE 3 shows one form of vehicle stabilizing apparatus in which the stiffness of the shock absorbers is controlled as a function of car speed, road roughness and curvature of the road. At slow speeds full advantage can be taken of the soft cushioned ride afforded by easy acting shock absorbers. But even at slow speeds a rough road requires some increase in stiffness if only to decrease recovery time. Again sharp reverse curves can make a car difficult to handle even at medium speeds and recovery becomes an increasingly important factor as speed builds up.

Shock absorbers indicated at 350 may each be provided with one, two or three energizing coils as shown. Coils 351 are energized by generator 352 driven at car speed from the driven shaft 353. At slow speed the output of generator 352 can be very small and increase according to any selected law until at speeds above fifty or sixty miles an hour the stiffness of the shock absorbers 350 has been materially increased by the increased current in coils 351.

When a car meets with alternately rough and smooth roads different stiffness is desirable in each case. Coils 354 can be energized by source 355 when a sudden bump causes weight 356 to close contact 357. Weight 356 moves upward readily to close contact 357, spring 358 maintaining the make until bleed hole 359 allows sufficient fluid to escape and weight 356 to fall far enough to open contacts 357. Leather collar 360 acts as a one-way seal. This rough road detector as a whole is indicated as 367.

Coils 361 are energized by source 362 when damped pendulum 363 indicates that the vehicle is turning and moves contact 364 off the center of resistance 365. It will be seen that the sharper the turn and the higher the speed at which the turn is made the greater the swing of contact 364 and the greater the current rise in coils 361 and at an increasing rate. Each of the three controls may be provided with an individual combined adjustment rheostat and cut out switch 366 if desired.

FIGURE 4 shows a stabilizing system similar to that of FIGURE 3. Although single coils 370 are shown for each of two or four shock absorbers it will be understood that three separate coils may be used as shown in FIGURE 3 and where a single coil 370 is used care must be exercised to assure that voltages and currents do not oppose each other improperly so as to reduce their combined effect rather than increasing it.

Shock absorber 371 may take the form shown in FIGURE 1, in which case coil 370 may correspond to coil 270. Shock absorber 371 may take the form shown in FIGURE 2, in which case coil 370 may correspond to coils 303. In addition to the shock absorber controls discussed in connection with FIGURE 3, a cornering device is added to increase stabilization and eliminate side sway on curves.

The cornering device utilizes the structure of FIGURE 2A to which the clutch 372 corresponds. Cable 373 corresponds to cable 321, but is resiliently attached to running gear member on wheel mounting arm 374 by a compression spring 375. Motor 376 operates to turn a shaft corresponding to shaft 320 when relay 377 closes. Magnetic particle clutches 372 are energized by coils 378 and 379 which are the counterpart of coils 303. The current in clutch coils 378 and 379 is controlled by a damped pendulum 380 which moves contact arm 381 off center-tap 382 of resistance 383 when the vehicle is moving in a curved path. The signal at leads 384 is amplified by amplifier 385 and supplied to coils 378 and 379 in the proper sense depending upon which direction pendulum 380 swings. Rectifiers 386 and 387 assure that the energizing current is present in coil 378 only when pendulum 380 swings to the right and that current flows to coil 379 only when the pendulum swings to the left.

When pendulum 380 swings right coil 378 is energized causing clutch 372 to operate and wind up cable 373. This action compresses springs 375 and 389, tilting the body of the car and shifting its center of gravity toward the center of curvature of the path of the vehicle, until pendulum 380 approaches the vertical and contact arm 381 is at mid-point 382. This action stabilizes the car dynamically and equalizes the road reaction force on the inner and outer wheels as they move along the curve. A cut-out or shunt switch may be provided to eliminate shock absorber stiffening for the very short time cable 373 is actually being wound in to shift the car body etc. It will be understood that all four wheels of the car are to be so treated. It will be understood that known wheel mountings such as ball-joint, pivoted arm, parallelogram or the like as may be found in the patented art are usable with the above arrangements. Again, aside from devices employing magnetic particles, it will be understood that a recognized equivalence exists between electrical, mechanical and hydraulic means and methods in the automotive control field as shown by the automatic transmission pioneer, Gaston Fleischel, in his domestic and foreign patents, among others U.S. Reissue No. 23,326 granted January 9, 1952. See also Les Rendements Planetaires en Diagrames by Fleischel, Dunod, Paris, 1953.

Reference is made to my copending U.S. Patent No. 2,718,157 and copending application S.N. 535,011, and S.N. 535,012, which latter application is now abandoned, filed simultaneously herewith.

The vehicle employed may be oil or include oil. Glycerine may be employed where the loads are light and heating effects are limited. For heavier loads, the pasty and dry powder mixes avoid bearing contamination and resist bad effects of localized heating. The magnetic material may be powdered magnetite which is the fully oxidizide magnetic oxide of iron, carbonyl iron, iron-nickel compounds, and the like.

For example, the pasty mass mentioned above may comprise the finely divided magnetic material mixed with a relatively small amount of oil while the powdered form may be the finely divided magnetic material alone, or with a very small amount of oil. For heavy duty transmissions such as automobiles, diesel locomotives, cranes and the like, it is preferred to use the dry, finely divided magnetic material alone or a powdery mixture of the magnetic material with oil or graphite which provides some lubrication without caking on the one hand, or penetration of the journal bearing seals on the other hand.

Bearing contamination may be avoided, as described above, but local heating effects between the magnetic mass and the moving parts require that the vehicle, when used at all, be stable at fairly high temperatures where loads are substantial, as in the automotive field. For such applications, the dry mass in powder form, or as filings, is preferred. The terms powder and filings are in many cases substantial equivalents, and the terms "particle" "powdery" and "finely divided material," are intended to include both.

The localized heating due to point or very small area friction contact, not only tends to break down the oil and glycerine vehicle, but may affect the magnetic material itself by corrosion or oxidation due to high temperatures, which may also change the physical and chemical characteristics of the magnetic material. For this reason, in some applications, the fully oxidized magnetite $Fe_3O_4$, may function better than carbonyl iron $Fe(CO)_4$, in which the carbonyl radical may be unstable at the required peak operating temperature. For this reason, the iron-nickel compounds are mentioned above in addition to iron-carbon compounds as representative of the large class of magnetic alloys in general which have good magnetic properties over a wide range of temperatures and resist corrosion, oxidation, and other undesirable changes when under load and subject to localized high temperatures. These examples are representative and are not intended to be limited either as individual items or as a class. The Curie point can be improved by mixture of two or more.

While there have been described above what are at present considered to be the preferred embodiments of the invention, it will be apparent to those skilled in the art that various changes and modifications may be made therein, in the light of the above disclosure, without departing from the spirit or scope of the invention. Accordingly, the appended claims have been variously worded in generic terms to include all those modifications and equivalent structures which fall within the true spirit of the invention.

I claim:

1. In combination, an automotive vehicle having a body member, a plurality of running wheels supporting said body and a suspension system mounting said body on said wheels, said system comprising shock absorber means having relatively movable members having a magnetic particle mass containing iron and a second metallic chemical element resistant to heat and corrosion positioned in force transmitting relation between said movable members, means to apply a magnetic field to said particles, turn sensing means and means to equalize at least partially the road reaction on the inner and outer wheels of said vehicle when in motion, said turn sensing means controlling both the action of said magnetic field on said particles and said equalizing means.

2. The combination set forth in claim 1, said system comprising at least one pivoted arm for each wheel, said shock absorbers acting to resist motion of said pivoted arm under control of said turn sensing means which acts to increase the effective action of said magnetic field as the forces produced by the turning action of the vehicle in its path increase, said equalizing means acting under the control of said turning sensing means to shift the center of gravity of said body toward the center of curvature of the path of said vehicle when in motion.

3. The combination set forth in claim 2, said sensing means comprising a damped pendulum mounted for transverse movement with respect to the longitudinal axis of the vehicle.

4. The combination set forth in claim 3, a vehicle driven generator, rough road detector means, said means to apply a magnetic field to said particles comprising a pair of parallel connected triple section coils for at least one shock absorber pair, the first sections of each triple coil pair being connected for control by said turn sensing means, the second sections of said coil pair being connected for control by said vehicle driven generator and the third sections of said coil pair being connected for control by said rough road detector means whereby a combined effective magnetic field may be applied to said particles.

5. Stabilizing means for a movable craft comprising in combination, a frame member, turn sensing means carried by said craft and mounted for sensing acceleration about a vertical axis of said craft, vibration sensing means carried by said craft and mounted for detecting forces acting on said craft parallel to said vertical axis, speed measuring means for determining the relative speed of the craft with respect to a contiguous reference material, a plurality of magnetic particle coupling devices comprising relatively movable members with magnetic particles in force transmitting relation to said relatively movable members, magnetic field producing means for energizing said particles for controlled transmission of force between said movable members, control circuit means for said magnetic field producing means, said control circuit means comprising said turn sensing means, said vibration sensing means, said speed measuring means, and at least one voltage source whereby the magnetic field produced by said field producing means and the resultant force transmitted between said coupling members is determined by the combined action of said turn sensing means, said vibration sensing means and said speed measuring means.

6. The combination set forth in claim 5, said field producing means being an individual magnet coil means for each coupling comprising a first winding controlled by said turn sensing means, a second winding controlled by said vibration sensing means and a third winding determined by said speed measuring means.

7. The combination set forth in claim 6, said circuit control means comprising a separate control circuit for said first windings as a group and having adjustable control impedance means therein, a separate control circuit for said second windings as a group and having adjustable control impedance means therein and a separate control for said third windings as a group and having adjustable control impedance means therein.

8. The combination set forth in claim 5, said coupling devices being positioned on opposite sides of said craft, said circuit means having variable impedance means therein to adjust the relative values of field produced by said field producing means under the control of said turn sensing means, said vibration sensing means and said speed measuring means, between the oppositely positioned coupling devices so that the force transmitted between the movable members of a coupling on one side of said craft may be different from the force transmitted between the movable members of a coupling on the opposite side of the craft.

9. The combination set forth in claim 5, said craft being an automotive vehicle having wheels supporting said frame, at least one said coupling device being positioned on each of two opposite sides of said frame as a pair, said pair of coupling devices being so constructed and mounted on the vehicle that energization thereof can produce a lateral shift of the effective center of gravity of said vehicle, motor means for driving one movable member of each said pair of couplings, the other movable member of each said pair of couplings being connected between said frame member and said wheels so that a signal from said turn sensing means applied to said control circuit means energizes at least one coupling of said pair to produce a lateral shift of the effective center of gravity of said vehicle toward the center of curvature of the path of said vehicle and tends to equalize the road reaction on wheels on opposite sides of said vehicle.

10. The combination set forth in claim 9, said pair of couplings being connected between said frame member and said wheels by linking means having adjustable length determined by said motor means.

11. Stabilizing means for a movable craft comprising in combination a frame member, a plurality of magnetic particle coupling devices comprising relatively movable members with magnetic particles in force transmitting relation to said relatively movable members, said coupling devices being positioned on opposite sides of said craft, magnetic field producing means for energizing said magnetic particles for selective controlled transmission of force between said movable members, control circuit means for said magnetic field producing means comprising acceleration responsive means and at least one source of field producing voltage and having circuit affecting means therein responsive to acceleration forces of translation and rotation acting on the craft, to determine the effect of the magnetic particles in said coupling devices, said particles containing iron and a metal resistant to corrosion, whereby the resistance to relative movement of at least some of said movable members is increased as said acceleration forces increase, said circuit affecting means being also responsive to the speed of said craft along its path whereby the resistance to relative movement of at least some of said movable members is increased as craft speed increases.

12. The combination set for in claim 11, said craft being an automotive vehicle having an engine, a drive shaft and a driven shaft, said source of field producing voltage being a generator driven by said driven shaft, said control circuit means comprising field producing coils on opposite sides of the vehicle, and means to determine the relative effect of the magnetic field on the magnetic particles on opposite side of the vehicle comprising a pair of variable impedances, one of said variable impedances being connected between said generator and at least one said field producing coil on one side of said vehicle and the other one of said pair of variable impedances being connected between said generator and at least one said field producing coil on the opposite side of said vehicle.

References Cited in the file of this patent
UNITED STATES PATENTS

| | | |
|---|---|---|
| 1,997,414 | Gibbons | Apr. 9, 1935 |
| 2,013,920 | Kulick | Sept. 10, 1935 |
| 2,247,749 | Venel | July 1, 1941 |
| 2,492,331 | Spring | Dec. 27, 1949 |
| 2,507,276 | Skwaryk | May 9, 1950 |
| 2,525,571 | Winther | Oct. 10, 1950 |
| 2,622,453 | Garnier | Dec. 23, 1952 |
| 2,623,758 | Cruz | Dec. 30, 1952 |
| 2,667,237 | Rabinow | Jan. 26, 1954 |
| 2,809,732 | Logan | Oct. 15, 1957 |